(12) United States Patent
Everett et al.

(10) Patent No.: US 8,548,668 B2
(45) Date of Patent: Oct. 1, 2013

(54) CONTROL SYSTEM HAVING TOOL TRACKING

(75) Inventors: Bryan J. Everett, Peoria, IL (US); Craig L. Koehrsen, East Peoria, IL (US); Rodney R. Richards, Morton, IL (US); Steven J. Cook, Ferny Hills (AU)

(73) Assignee: Caterpillar Inc., Peoria, IL (US)

( * ) Notice: Subject to any disclaimer, the term of this patent is extended or adjusted under 35 U.S.C. 154(b) by 15 days.

(21) Appl. No.: 13/198,457

(22) Filed: Aug. 4, 2011

(65) Prior Publication Data

US 2012/0136525 A1    May 31, 2012

Related U.S. Application Data

(60) Provisional application No. 61/418,344, filed on Nov. 30, 2010.

(51) Int. Cl.
*G05D 1/00* (2006.01)

(52) U.S. Cl.
USPC .............. 701/24; 701/50; 702/22; 702/127; 700/186; 173/104; 219/130.5; 606/1; 244/136; 73/105; 455/127.5; 368/28; 382/104; 345/158

(58) Field of Classification Search
USPC .............. 701/50; 702/22, 127; 700/186; 173/104; 219/130.5; 606/1; 244/136; 455/127.5; 368/28; 382/104; 345/158
See application file for complete search history.

(56) References Cited

U.S. PATENT DOCUMENTS

| | | | |
|---|---|---|---|
| 4,600,999 A | 7/1986 | Ito et al. | |
| 4,751,970 A * | 6/1988 | Hecker et al. | 173/104 |
| 4,986,384 A | 1/1991 | Okamoto et al. | |
| 5,005,652 A | 4/1991 | Johnson | |
| 5,375,663 A | 12/1994 | Teach | |
| 5,586,030 A | 12/1996 | Kemner et al. | |
| 5,913,914 A | 6/1999 | Kemner et al. | |
| 5,925,081 A | 7/1999 | Hawkins et al. | |
| 5,931,875 A | 8/1999 | Kemner et al. | |

(Continued)

FOREIGN PATENT DOCUMENTS

| EP | 1571515 | 9/2005 |
|---|---|---|
| GB | 2448972 | 11/2008 |

OTHER PUBLICATIONS

U.S. Appl. No. 13/198,380 of Bryan J. Everett et al. entitled "Machine Control System Having Autonomous Dump Queuing" filed Aug. 4, 2011.

(Continued)

*Primary Examiner* — James Trammell
*Assistant Examiner* — Sanjeev Malhotra
(74) *Attorney, Agent, or Firm* — Finnegan, Henderson, Farabow, Garrett & Dunner LLP

(57) ABSTRACT

A control system is disclosed for use with a machine having a work tool and operating at a work site. The control system may have a sensor associated with the work tool and configured to generate a signal indicative of a position of the work tool, an offboard worksite controller, and an onboard controller in communication with the sensor and the offboard worksite controller. The onboard controller may be configured to receive from an operator an input indicative of a current task being performed by the machine, and track movement of a portion of the work tool corresponding with the operator input. The onboard controller may also be configured to communicate the tracked movement to the offboard worksite controller.

24 Claims, 4 Drawing Sheets

(56) References Cited

U.S. PATENT DOCUMENTS

| | | | |
|---|---|---|---|
| 5,961,560 | A | 10/1999 | Kemner |
| 6,128,574 | A | 10/2000 | Diekhans |
| 6,236,924 | B1 | 5/2001 | Motz et al. |
| 6,246,932 | B1 | 6/2001 | Kageyama et al. |
| 6,836,982 | B1 | 1/2005 | Augustine |
| 7,516,563 | B2 | 4/2009 | Koch |
| 2002/0143461 | A1 | 10/2002 | Burns et al. |
| 2004/0045945 | A1* | 3/2004 | Shimogama et al. ...... 219/130.5 |
| 2004/0068352 | A1 | 4/2004 | Anderson |
| 2004/0116906 | A1* | 6/2004 | Lipow ................ 606/1 |
| 2004/0158355 | A1 | 8/2004 | Holmqvist et al. |
| 2005/0043898 | A1* | 2/2005 | Linsen et al. ................... 702/22 |
| 2006/0069472 | A1 | 3/2006 | Makela |
| 2006/0149465 | A1 | 7/2006 | Park et al. |
| 2007/0007391 | A1* | 1/2007 | McCoskey et al. ........... 244/136 |
| 2007/0033991 | A1* | 2/2007 | Rice et al. ...................... 73/105 |
| 2008/0133128 | A1 | 6/2008 | Koch |
| 2008/0160937 | A1* | 7/2008 | Baker et al. ................ 455/127.5 |
| 2008/0208416 | A1* | 8/2008 | Yuet et al. ...................... 701/50 |
| 2008/0270066 | A1* | 10/2008 | Blaser et al. ................... 702/127 |
| 2009/0003138 | A1* | 1/2009 | Donnelli et al. ................. 368/28 |
| 2009/0202109 | A1* | 8/2009 | Clar et al. ...................... 382/104 |
| 2009/0259373 | A1* | 10/2009 | Nichols et al. ................... 701/50 |
| 2010/0066676 | A1* | 3/2010 | Kramer et al. ................ 345/158 |
| 2010/0076640 | A1 | 3/2010 | Maekawa et al. |
| 2011/0029125 | A1* | 2/2011 | Feinauer et al. .............. 700/186 |

OTHER PUBLICATIONS

U.S. Appl. No. 13/198,480 of Bryan J. Everett et al. entitled "Machine Control System Having Autonomous Resource Queuing" filed Aug. 4, 2011.

U.S. Appl. No. 13/198,428 of Bryan J. Everett et al. entitled "System for Autonomous Path Planning and Machine Control" filed Aug. 4, 2011.

U.S. Appl. No. 13/198,334 of Bryan J. Everett et al. entitled "System for Automated Excavation Planning and Control" filed Aug. 4, 2011.

* cited by examiner

CONTROL SYSTEM HAVING TOOL TRACKING

RELATED APPLICATIONS

This application is based on and claims the benefit of priority from U.S. Provisional Application No. 61/418,344 by Bryan J. EVERETT, Craig L. KOEHRSEN, Rodney R. RICHARDS, and Steven J. COOK, filed Nov. 30, 2010, the contents of which are expressly incorporated herein by reference.

TECHNICAL FIELD

The present disclosure relates generally to a machine control system, and more particularly, to a control system for tracking a machine tool.

BACKGROUND

Autonomy in excavation applications, for example mining applications, is becoming more common as the drive for productivity, efficiency, and safety increases. In order for an autonomous machine to operate optimally, the machine requires accurate knowledge of the terrain over which the machine operates. Operation of the machine itself, however, can cause changes in the terrain that make control difficult. These terrain changes require that the underlying terrain be continuously surveyed and systems of the autonomous machines updated to reflect the changes. Unfortunately, such surveys and updates can interrupt the excavation process and result in decreased productivity and efficiency.

One attempt at improving terrain surveying in an excavation application is described in U.S. Pat. No. 7,516,563 (the '563 patent) issued to Koch on Apr. 14, 2009. In particular, the '563 patent describes an autonomous mining machine that includes an earthmoving implement such as a bucket or a blade, and a machine positioning system configured to determine a location of the implement during operation. The machine positioning system includes one or more position sensors located on or associated with the implement and configured to generate signals corresponding to a three-dimensional position of the implement. The signals are directed to a machine controller that uses the three-dimensional position of the implement to update an electronic terrain map in real time as excavation takes place. The terrain map, embodied as a database, is then accessed by the controller and used in the autonomous control of the machine.

Although the system of the '563 patent may provide real time knowledge of the terrain over which the autonomous mining machine operates, it may be less than optimal. For example, the three-dimensional implement position may generate large amounts of data that can be cumbersome to process, slows down the system, and requires a large storage space.

The disclosed control system is directed to overcoming one or more of the problems set forth above and/or other problems of the prior art.

SUMMARY OF THE INVENTION

In one aspect, the present disclosure is directed to a control system for use with a machine having a work tool and operating at a work site. The control system may include a sensor associated with the work tool and configured to generate a signal indicative of a position of the work tool, an offboard worksite controller, and an onboard controller in communication with the sensor and the offboard worksite controller. The onboard controller may be configured to receive from an operator an input indicative of a current task being performed by the machine, and track movement of a portion of the work tool corresponding with the operator input. The onboard controller may also be configured to communicate the tracked movement to the offboard worksite controller.

In another aspect, the present disclosure is directed to a computer readable medium having computer executable instructions for performing a method of machine control. The method may include sensing a position of a work tool, receiving from an operator an input indicative of a current machine task, and tracking movement of a portion of the work tool corresponding with the operator input based on the sensed position. The method may also include updating a worksite terrain map based on the tracked movement.

DETAILED DESCRIPTION

Figure 1:
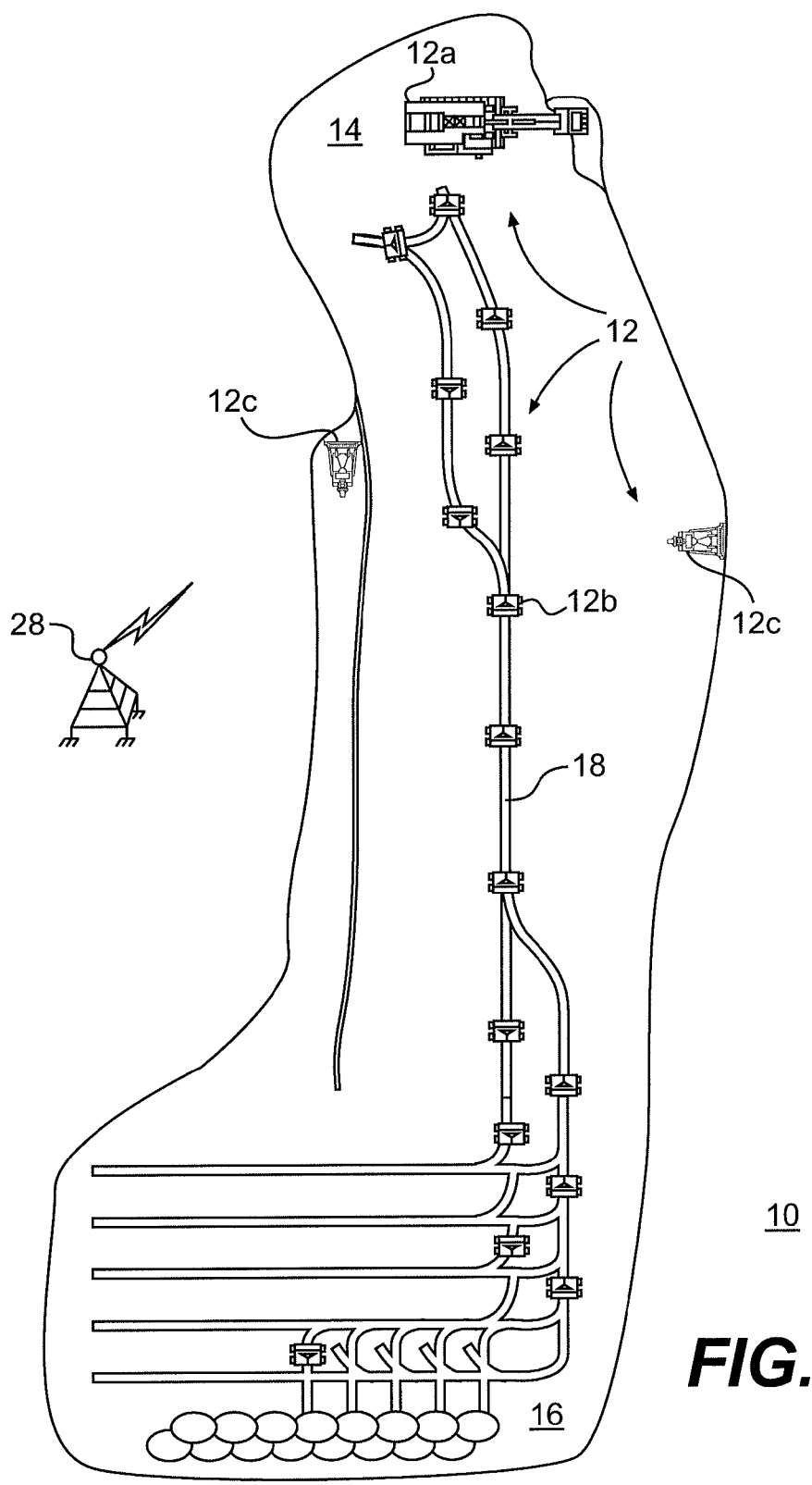
FIG. 1 is a pictorial illustration of an exemplary disclosed worksite.

FIG. 1 illustrates an exemplary worksite 10 having multiple, simultaneously-operable machines 12 performing a variety of predetermined tasks. Worksite 10 may include, for example, a mine site, a landfill, a quarry, a construction site, or any other type of worksite known in the art. The predetermined tasks may be associated with altering the current geography at worksite 10 and include a clearing operation, a leveling operation, a hauling operation, a digging operation, a loading operation, or any other type of operation that functions to alter the current geography at worksite 10.

Worksite 10 may include multiple locations designated for particular purposes. For example, a first location 14 may be designated as a load location at which a mobile loading machine 12a operates to excavate and fill multiple mobile haul machines 12b with material. A second location 16 may be designated as a dump location at which machines 12b discard their payloads. Machines 12b may follow a travel path 18 that generally extends between load and dump locations 14, 16. One or more other mobile dozing or grading machines 12c at worksite 10 may be tasked with clearing or leveling load location 14, dump location 16, and/or travel path 18 such that travel by other machines 12 at these locations may be possible. As machines 12 operate at worksite 10, the shapes, dimensions, and general positions of load location 14, dump location 16, and travel path 18 may change. Machines 12 may be self-directed machines configured to autonomously traverse the changing terrain of worksite 10, manned machines configured to traverse worksite 10 under the control of an operator, or hybrid machines configured to perform some functions autonomously and other functions under the control of an operator. In the disclosed embodiment, at least some of machines 12 at worksite 10 are autonomously controlled.

Figure 2:
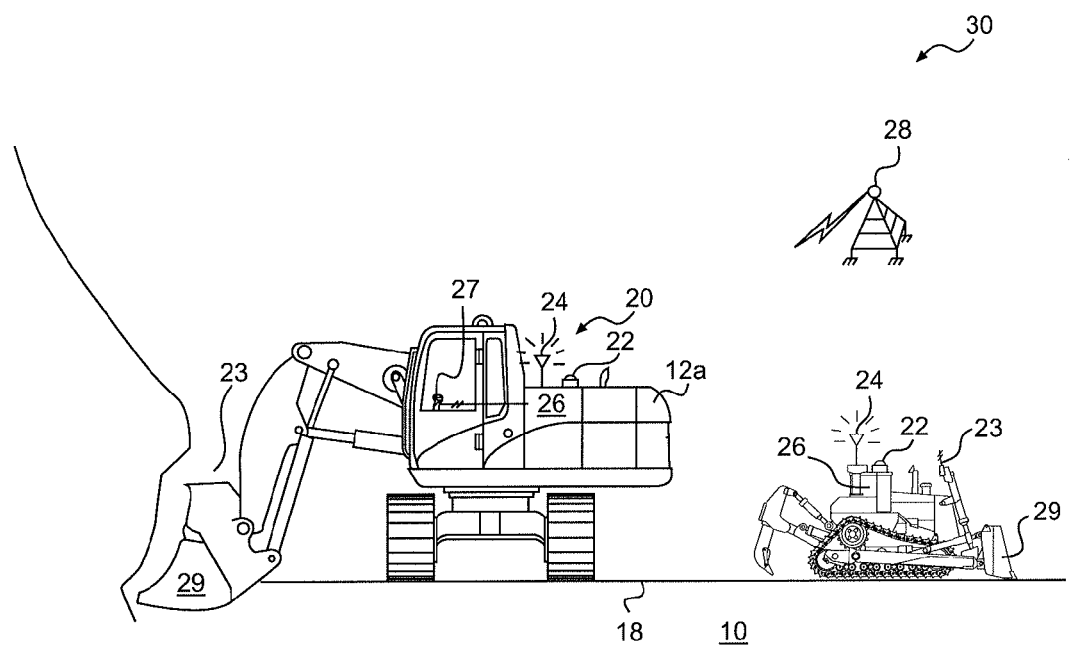
FIG. 2 is a pictorial illustration of an exemplary disclosed control system that may be used at the worksite of FIG. 1.

As shown in FIG. 2, each machine 12 may be equipped with a control module 20 that facilitates or enhances autonomous and/or human control of machine 12. Control module 20 may include, among other things, a locating device 22, a work tool sensor 23, a communicating device 24, and an onboard controller (OC) 26 connected to locating device 22, work tool sensor 23, and communicating device 24. When intended for use with a manually operated machine 12, control module 20 may also include one or more operator interface devices 27. Operator interface devices 27 may include, for example, an input device such as a joystick, keyboard, steering wheel, pedal, lever, button, switch, etc. Alternatively or additionally, operator interface devices 27 may include a display device such as a monitor, if desired.

Locating device 22 may be configured to determine a position of machine 12 and generate a signal indicative thereof. Locating device 22 could embody, for example, a Global Positioning System (GPS) device, an Inertial Reference Unit (IRU), a local tracking system, or any other known locating device that receives or determines positional information associated with machine 12. Locating device 22 may be configured to convey in real time a signal indicative of the received or determined positional information to OC 26 for processing. It is contemplated that the location signal may also be directed to one or more of interface devices 27 (e.g., to the monitor) for display of machine location in an electronic representation of worksite 10, if desired.

Work tool sensor 23 may embody any type of sensor configured to detect a position of a work tool 29 relative to a known position on machine 12 (e.g., relative to locating device 22), and generate a corresponding signal. In one example, work tool sensor 23 may be an acoustic, magnetic, or optical type sensor associated with actuators and linkage that move work tool 29, for example associated with a hydraulic ram, a rotary motor, or a joint. In another example, work tool sensor 23 may be a local and/or global positioning sensor configured to communicate with offboard devices (e.g., local laser systems, radar systems, satellites, etc.) to directly determine local and/or global coordinates of work tool 29. It should be noted that any number and type of work tool sensors 23 may be included and positioned at any location on or near work tool 29. Based on signals generated by work tool sensor(s) 23 and based on known kinematics of machines 12, each OC 26 may be configured to determine in real time a location of the associated work tool 29 relative to the known position of machine 12.

Communicating device 24 may include hardware and/or software that enables sending and receiving of data messages between OC 26 and an offboard worksite controller (OWC) 28. OWC 28, together with each control module 20 of machines 12, may embody a control system 30. The data messages associated with control system 30 may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable communications device 24 to exchange information between OWC 28 and the components of control module 20.

Based on real time position information from locating device 22 and work tool sensor 23, each OC 26 may be configured to help regulate movements and/or operations of its associated machine 12 (e.g., direct movement of associated traction devices, work tool 29, and/or actuators; and operations of associated engines and/or transmissions). OC 26 may be configured to autonomously control these movements and operations or, alternatively, provide instructions to a human operator of machine 12 regarding recommended control. OC 26 may also be configured to send real time operational information associated with components of machine 12 offboard to OWC 28 via communicating device 24, if desired. This information may include, for example, the coordinates of machine 12, a traction device speed and/or orientation, tool and/or actuator positions, status information (e.g., temperatures, velocities, pressures, gear ratios, etc.), and other information known in the art.

OC 26 may embody a single or multiple microprocessors, field programmable gate arrays (FPGAs), digital signal processors (DSPs), etc., that include a means for controlling operations of machine 12 in response to operator requests, built-in constraints, sensed operational parameters, and/or communicated instructions from OWC 28. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

OWC 28 may include any means for monitoring, recording, storing, indexing, processing, and/or communicating various operational aspects of work worksite 10 and machine 12. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

OWC 28 may be configured to execute instructions stored on computer readable medium to perform a method of machine control. The method may begin with the tracking of machine and work tool positions by locating device 24 and work tool sensor 23. This location information may be passed in real time to OC 26 and OWC 28 for further processing. OC 26 may use the location information as feedback for autonomous control of machine 12, while OWC 28 may use the information to update an electronic terrain map of worksite 10 stored in memory.

Figure 3:
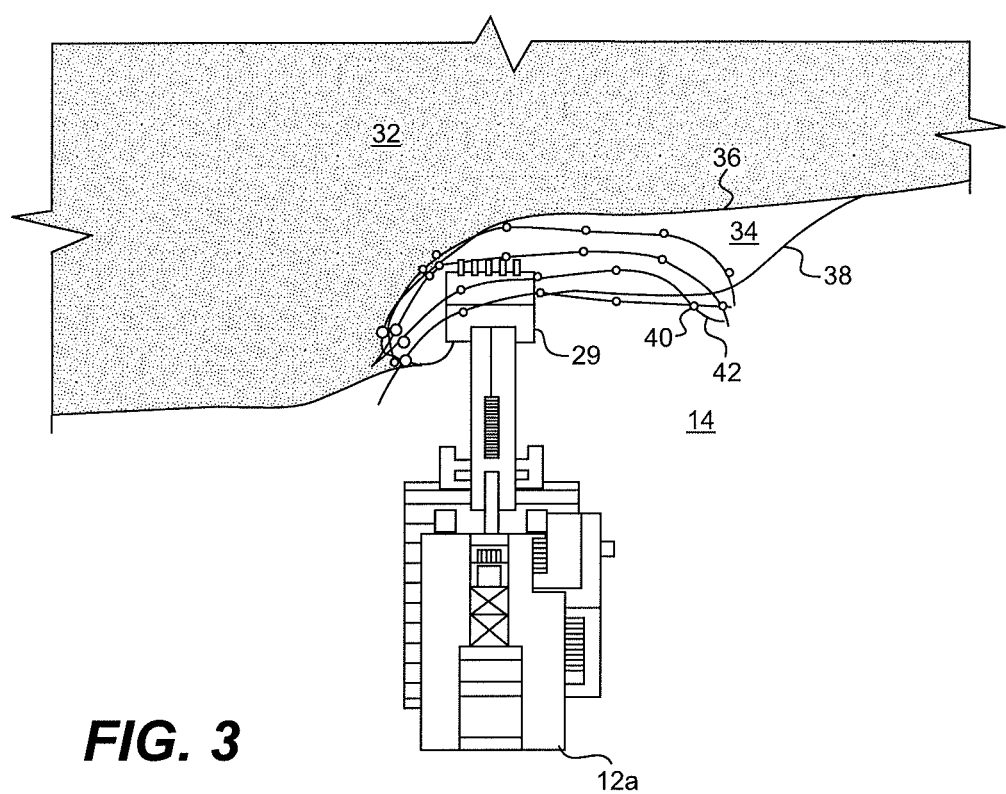
FIG. 3 is a pictorial illustration of an exemplary disclosed operation being performed by the control system of FIG. 2.

The electronic terrain map may be a compilation of data that is periodically updated by OWC 28 with changes made to worksite 10 by machines 12. The changes made to worksite 10 may be determined by tracking the movement of work tool 29 during performance of an excavation task by a corresponding machine 12. For example, FIG. 3 illustrates machine 12a performing a bulk material removal task at loading location 14. In this illustration, a shaded region 32 represents an undisturbed area of worksite 10, while a region 34 immediately adjacent shaded region 32 represents an area recently excavated by machine 12a. A boundary line 36 of shaded region 32 may delineate a theoretical edge of a traversable workspace at load location 14 and be used by OCW 28 and/or OC 26 to plan out autonomous movements of machines 12 at worksite 10. A boundary line 38 of region 34 may represent a previously known edge of the traversable workspace. As machine 12a removes material from region 32, an area of region 34 may increase and boundary line 36 may move outward in a direction away from region 34.

The material removed from region 32 may be determined by tracking a trajectory of work tool 29 via work tool sensor 23, and assuming that a space of region 32 through which a known portion or volume of work tool 29 moves must be void of material. Data points 40 shown in FIG. 3 may represent locations at which the movement of work tool 29 is sampled by work tool sensor 23, and trend lines 42 shown in FIG. 3 may connect successively sampled data points 40 to illustrate the trajectory of work tool 29. Based on this trajectory and a known geometry (e.g., known volume and/or shape) of work tool 29, OCW 28 may plot regions 32 and 34 and boundary lines 36 and 38 on the electronic terrain map stored in memory. This electronic terrain map may be continuously updated in real time with work tool movements of all machines 12 operating at worksite 10, and communicated to control modules 20 of all machines 12 at worksite 10 for subsequent use in control of the individual machines 12.

Although tracking the moving volume of work tool 29 may provide an accurate representation of worksite terrain, tracking movement of the entire volume of work tool 29 may also require generation, transmission, processing, and storage of large amounts of data that can slow operation of control system 30 and consume valuable resources. In some situations, it may be unnecessary to track, communicate, process, and store data associated with movement of the entire volume of work tool 29. For example, at different times during a typical work cycle, machine 12a may sweep a bottom portion of work tool 29 across an already excavated surface of load location 14 to smooth the surface for travel by machines 12b. This tool movement, although helpful, may not remove a significant amount of material from the work surface. Accordingly, only movement of a portion of work tool 29 (e.g., the bottom portion) may need to be tracked, communicated, and stored, that portion providing an indication as to the location of the work surface. By reducing the amount of data handling performed by control system 30, a speed of control system may be increased and the use of limited resources may be reduced.

Control system 30 may be configured to receive operator input regarding which task is currently being performed by a particular machine 12, and utilize this input to customize the data handling. In one example, an operator may be able to select, via one of interface devices 27, a current task from a list of available tasks stored in the memory of OC 26. The list of available tasks may include, among other things, a floor cleanup task, an edge finalizing task, and a bulk material removal task. Based on which task is selected by the operator, movement of only a corresponding portion of work tool 29 may be tracked and used to update the electronic terrain map. For example, when the floor cleanup task is selected, only a bottom portion, a center edge portion, or another desired portion of work tool 29 may be tracked. When the edge finalizing task is selected, only a side edge or tip of work tool 29 may be tracked. When the bulk material removal task is selected, an entire volume of work tool 29 may be tracked. It is contemplated that only location information corresponding to the desired portion of work tool 29 may be communicated to OWC 28, or that all location information corresponding to movement of work tool 29 may alternatively be communicated and OWC 28 may process only a subset of that information that corresponds to the desired portion of work tool 29, as desired.

Figure 4:
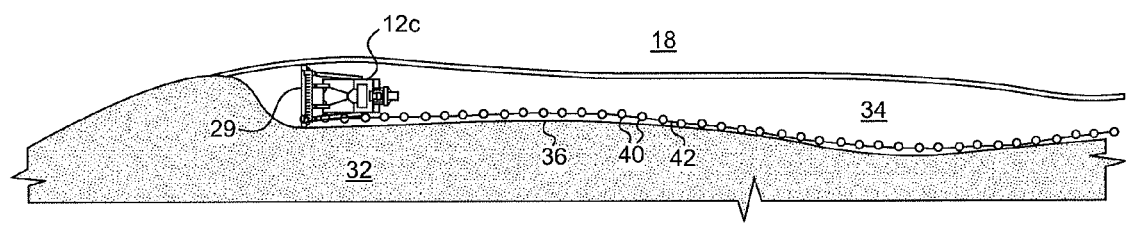
FIG. 4 is a pictorial illustration of another exemplary disclosed operation being performed by the control system of FIG. 2.

FIG. 4 illustrates a situation where machine 12c is finalizing an edge of worksite 10. In this example, it may only be important to know the location of one side of work tool 29. Accordingly, the operator, in this situation, may select via interface device 27 the edge finalizing task as the current task being performed by machine 12c. In response to this selection, only the outside edge of work tool 29 may be tracked and utilized to determine and plot the location of boundary line 36. By tracking only the outside edge of work tool 29 an amount of data generation, communication, processing, and storage associated therewith may be reduced.

Figure 5:
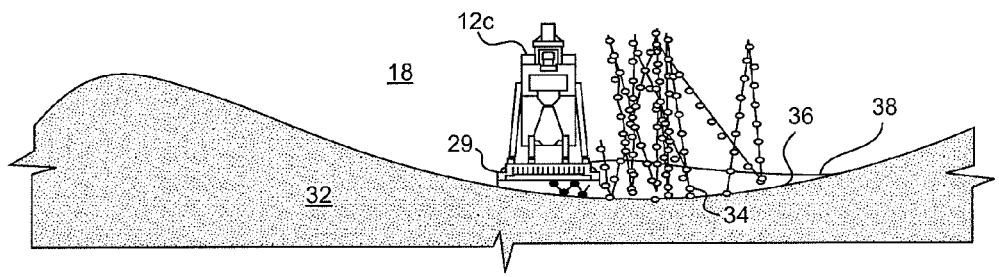
FIG. 5 is a pictorial illustration of yet another exemplary disclosed operation being performed by the control system of FIG. 2.

FIG. 5 illustrates a situation where machine 12c is performing the floor cleanup task. In this example, it may only be important to know a location of a bottom center edge of work tool 29. Accordingly, the operator, in this situation, may select via interface device 27 the floor cleanup task as the current task being performed by machine 12c. In response to this selection, only the bottom center edge of work tool 29 may be tracked and utilized to determine and plot the location of boundary line 36. By tracking only the bottom center edge of work tool 29 an amount of data generation, communication, processing, and storage may be reduced.

It may be possible to further reduce data handling, by selectively filtering the data based on particular criteria. That is, as shown in FIG. 5, even when tracking only a desired portion of work tool 29, many data points can be generated that do not fall within regions 32 or 34 or even close to boundary lines 36 or 38. The generation, communication, processing, and storage of this data may not be necessary and only function to slow control system 30 and consume limited resources. Accordingly, the data generated by work tool sensor 23 may be filtered based on a distance from boundary line 38. In one example, only those data points farthest from boundary line 38, in the direction of region 32, may be communicated by OC 26 and/or processed by OWC 28. That is, only data points that tend to increase a traversable area at worksite 10 may be tracked by control system 30.

INDUSTRIAL APPLICABILITY

The disclosed control system may be applicable to any machine and worksite application where accurate terrain mapping is important. Although applicable to any type of machine and worksite, the disclosed control system may be particularly applicable to an autonomously controlled machine operating at a common worksite with other machines. The disclosed system may update in real time an electronic terrain map used by all machines based on machine and work tool movements.

Because control system 30 may track movement of only desired portions of work tool 29, control system 30 may have reduced data handling requirements. Specifically, the control system 30 may generate, communicate, process, and store a reduced amount of data when tracking only the desired portion of work tool 29. This reduced amount of data may allow for high speed data handling with fewer resources. The high speed data handling may facilitate terrain map updating in real time, which may improve control over machines 12. The reduced use of resources may allow for a simple and low cost system.

It will be apparent to those skilled in the art that various modifications and variations can be made to the disclosed system. Other embodiments will be apparent to those skilled in the art from consideration of the specification and practice of the disclosed system. For example, although the selection of tasks currently being performed by machine 12 has been described as a manual process performed by an operator of machine 12, it is contemplated that the current task may alternatively be automatically determined based on one or more sensed machine parameters, if desired. For example based on a measured high load at one edge of work tool 29, based on work tool movements relative to machine movements, based on work tool location relative to work area boundaries, etc., control system 30 may be able to automatically determine the current task being performed. It is intended that the specification and examples be considered as exemplary only, with a true scope being indicated by the following claims and their equivalents.

What is claimed is:

1. A control system for a machine having a work tool and operating at a work site, the control system comprising:
   a sensor associated with the work tool and configured to generate a signal indicative of a position of the work tool;
   an offboard worksite controller;
   an onboard controller in communication with the sensor and the offboard worksite controller, the onboard controller configured to:
      receive an input indicative of a current task being performed by the machine;
      track movement of a portion of the work tool corresponding with the input; and
      communicate the tracked movement to the offboard worksite controller;
   wherein the offboard worksite controller is configured to:
      update a worksite terrain map based on the tracked movement; and
      communicate the updated worksite terrain map to the onboard controller.

2. The control system of claim 1, wherein
   one of the onboard controller and the offboard worksite controller is configured to filter the tracked movement of the work tool based on a distance from a known boundary of the worksite; and
   the offboard worksite controller is configured to update the worksite terrain map based on tracked movements farthest from the known boundary in a particular direction.

3. The control system of claim 2, wherein:
   the offboard worksite controller is configured to update the worksite terrain map based only on tracked movements farthest from the known boundary in a particular direction.

4. The control system of claim 1, wherein the onboard controller is further configured to autonomously control the machine based on the updated worksite terrain map.

5. The control system of claim 1, wherein the offboard worksite controller is further configured to:
   update the worksite terrain map based on tracked movements of work tools of other machines also operating at the worksite; and
   communicate the updated worksite terrain map to onboard controllers of the other machines.

6. The control system of claim 1, wherein the input is a selection of available predefined tasks.

7. The control system of claim 6, wherein the available predefined tasks include a floor cleanup task, an edge finalizing task, and a bulk material removal task.

8. The control system of claim 7, wherein, when the input is a selection of the floor cleanup task, the offboard worksite controller is configured to track movement of only a center edge portion of the work tool based on the signal.

9. The control system of claim 7, wherein, when the input is a selection of the edge finalizing task, the offboard worksite controller is configured to track movement of only a side edge of the work tool based on the signal.

10. The control system of claim 7, wherein, when the input is a selection of the bulk material removal task, the offboard worksite controller is configured to track movement of an entire volume of the work tool based on the signal.

11. The control system of claim 1, further including an onboard locating device configured to determine a location of the machine, wherein:
    the signal is indicative of a position of the work tool relative to the location of the machine; and
    the onboard controller is further configured to communicate the location of the machine to the offboard worksite controller.

12. The control system of claim 1, wherein the onboard controller is configured to communicate the tracked movement of the portion of the work tool to the offboard worksite controller in real time.

13. A computer readable medium having computer executable instructions for performing a method of machine control, the method comprising:
    sensing a position of a work tool;
    receiving an input indicative of a current machine task;
    tracking movement of a portion of the work tool corresponding with the input based on the sensed position;
    updating a worksite terrain map based on the tracked movement; and
    communicate the updated worksite terrain map to the onboard controller.

14. The computer readable medium of claim 13, wherein:
    the method further includes filtering the tracked movement of the work tool based on a distance from a known worksite boundary; and
    updating the worksite terrain map includes updating the worksite terrain map based only on tracked movements farthest from the known worksite boundary in a particular direction.

15. The computer readable medium of claim 14, wherein the method further includes autonomously controlling a machine based on the updated worksite terrain map.

16. The computer readable medium of claim 13, wherein the method further includes:
    updating the worksite terrain map based on tracked movements of work tools of multiple machines operating at a common worksite; and
    communicating the updated worksite terrain map to each of the multiple machines.

17. The computer readable medium of claim 13, wherein the input is a selection of available predefined tasks.

18. The computer readable medium of claim 17, wherein the available predefined tasks include a floor cleanup task, an edge finalizing task, and a bulk material removal task.

19. The computer readable medium of claim 18, wherein, when the input is a selection of the floor cleanup task, tracking movement of a portion of the work tool includes tracking movement of only a center edge portion of the work tool.

20. The computer readable medium of claim 18, wherein, when the input is a selection of the edge finalizing task, tracking movement of a portion of the work tool includes tracking movement of only a side edge of the work tool.

21. The computer readable medium of claim 18, wherein, when the input is a selection of the bulk material removal task, tracking movement of a portion of the work tool includes tracking movement of only a side edge of the work tool.

22. The computer readable medium of claim 13, wherein:
    the method further includes determining a machine location; and
    tracking movement of a portion of the work tool includes tracking movement of the portion of the work tool relative to the machine location.

23. A computer readable medium having computer executable instructions for performing a method of machine control, the method comprising:

determining a machine location;
sensing a position of a work tool relative to the machine location;
receiving from an operator a selection of a current machine task from a list of available machine tasks;
tracking movement of a portion of the work tool corresponding with the selection based on the sensed position of the work tool;
filtering the tracked movement of the work tool based on a distance from a known worksite boundary; and
updating the worksite terrain map based on tracked movements farthest from the known worksite boundary in a particular direction.

24. The computer readable medium of claim 23, wherein the method further includes autonomously controlling a machine based on the updated worksite terrain map.

* * * * *